US010122476B2

(12) United States Patent
Sun et al.

(10) Patent No.: US 10,122,476 B2
(45) Date of Patent: Nov. 6, 2018

(54) RADIO UNIT WITH INTERNAL PARALLEL ANTENNA CALIBRATION

(71) Applicant: Telefonaktiebolaget LM Ericsson (publ), Stockholm (SE)

(72) Inventors: Xuejun Sun, Beijing (CN); Chang Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 47 days.

(21) Appl. No.: 15/034,199

(22) PCT Filed: Nov. 8, 2013

(86) PCT No.: PCT/CN2013/086746
§ 371 (c)(1),
(2) Date: May 4, 2016

(87) PCT Pub. No.: WO2015/066883
PCT Pub. Date: May 14, 2015

(65) Prior Publication Data
US 2016/0294488 A1  Oct. 6, 2016

(51) Int. Cl.
*H03C 1/62* (2006.01)
*H04B 17/00* (2015.01)
(Continued)

(52) U.S. Cl.
CPC ........... *H04B 17/12* (2015.01); *H04B 17/102* (2015.01); *H04B 17/103* (2015.01); *H04B 17/14* (2015.01);
(Continued)

(58) Field of Classification Search
CPC ........ H01Q 3/267–3/44; H01Q 3/2605; H01Q 3/34; H04B 17/10–17/29; H04B 7/0617–7/0665
(Continued)

(56) References Cited

U.S. PATENT DOCUMENTS 6,252,542 B1 *  6/2001  Sikina ................... H01Q 3/267
                                              342/174
6,480,153 B1 * 11/2002  Jung .................... H01Q 3/267
                                              342/174
(Continued)

FOREIGN PATENT DOCUMENTS

CN        1324504 A     11/2001
CN        1595831 A      3/2005
(Continued)

*Primary Examiner* — Edward Urban
*Assistant Examiner* — Rui Hu
(74) *Attorney, Agent, or Firm* — Murphy, Bilak & Homiller, PLLC (57) ABSTRACT

The present disclosure provides a radio unit with internal parallel antenna calibration. The radio unit comprises an antenna calibrator, a plurality of transmission signal processing sections, a plurality of power amplifiers, a plurality of bandpass filters, a plurality of couplers, a plurality of reception signal processing sections and a first combiner. The antenna calibrator is configured to generate a plurality of individually identifiable reference signals used for transmission calibration. The transmission signal processing sections are configured to modulate the signals in parallel. The power amplifiers are configured to amplify the modulated signals to predetermined power levels in parallel. The bandpass filters are configured to apply bandpass filtering operations to the modulated signals in parallel. The couplers are configured to couple the filtered signals to a first combiner, which combines the filtered signals. One of the reception signal processing sections is configured to identify and demodulate each of the filtered signals constituting the combined signals. The antenna calibrator is further configured to compute transmission calibration vectors by comparing the demodulated signals with the reference signals.

9 Claims, 8 Drawing Sheets

(51) Int. Cl.
*H04B 17/12* (2015.01)
*H04B 17/21* (2015.01)
*H04B 17/10* (2015.01)
*H04B 17/14* (2015.01)
*H04B 7/04* (2017.01)

(52) U.S. Cl.
CPC .............. *H04B 17/21* (2015.01); *H04B 7/04* (2013.01); *H04B 17/0085* (2013.01)

(58) Field of Classification Search
USPC ...... 455/25, 63.4, 272–279.1, 126, 103–105, 455/115.1–115.4
See application file for complete search history.

(56) References Cited

U.S. PATENT DOCUMENTS

| | | | | |
|---|---|---|---|---|
| 6,690,952 | B2 * | 2/2004 | Nishimori | H01Q 3/2605 342/174 |
| 8,019,285 | B2 * | 9/2011 | Nakamura | G01S 3/46 455/267 |
| 8,391,377 | B2 * | 3/2013 | Zhu | H01Q 1/246 375/259 |
| 9,692,530 | B2 * | 6/2017 | O'Keeffe | H01Q 21/24 |
| 2005/0140546 | A1 * | 6/2005 | Park | G01S 7/4008 342/368 |
| 2005/0239419 | A1 * | 10/2005 | Fudaba | H04B 17/12 455/101 |
| 2006/0202891 | A1 * | 9/2006 | Izumi | H04B 17/21 342/368 |
| 2006/0286940 | A1 * | 12/2006 | Izumi | H01Q 3/2605 455/78 |
| 2008/0012748 | A1 * | 1/2008 | Ahn | H01Q 3/267 342/21 |
| 2008/0079634 | A1 * | 4/2008 | Nakamura | G01S 3/46 342/368 |
| 2011/0134972 | A1 * | 6/2011 | Zhu | H01Q 1/246 375/219 |
| 2011/0279147 | A1 * | 11/2011 | Montalvo | H04W 56/0035 327/3 |
| 2012/0020396 | A1 * | 1/2012 | Hohne | H01Q 3/267 375/224 |
| 2013/0260844 | A1 * | 10/2013 | Rucki | H01Q 1/246 455/575.7 |
| 2016/0254870 | A1 * | 9/2016 | O'Keeffe | H01Q 21/24 455/67.14 |

FOREIGN PATENT DOCUMENTS

| | | | | |
|---|---|---|---|---|
| CN | 101582714 | A | 11/2009 | |
| CN | 202713297 | U | 1/2013 | |
| CN | 103139884 | A | 6/2013 | |
| JP | 2009278529 | A * | 11/2009 | ............ H01Q 3/267 |
| WO | 2013036182 | A1 | 3/2013 | |

* cited by examiner

RADIO UNIT WITH INTERNAL PARALLEL ANTENNA CALIBRATION

TECHNICAL FIELD

The present disclosure generally relates to the technical field of antenna calibration, and particularly, to a radio unit with internal parallel antenna calibration.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Smart/adaptive antenna beam forming, which allows for directional transmission and reception of wireless signals, is one of the key technologies in Time Division Duplex (TDD) mobile communications. For accurate directivity, beam forming requires individual radio paths to have the same phase and amplitude response. To satisfy this requirement, the so-called antenna calibration process must be performed, whereby the difference in phase and amplitude among radio paths can be compensated for.

Since transmission paths and reception paths within a radio unit are independent from each other, antenna calibration shall be further divided into transmission calibration and reception calibration. In the case of transmission calibration, each transmission path is calibrated relative to the other transmission paths. In the case of reception calibration, each reception path is calibrated relative to the other reception paths.

Figure 1:
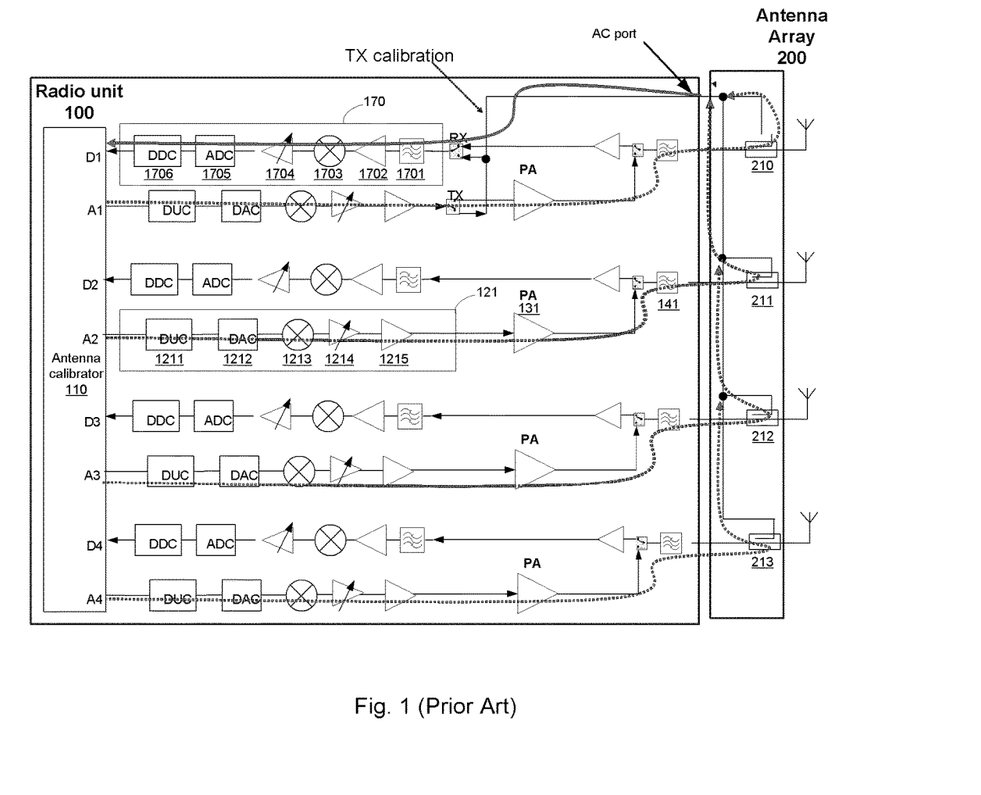
FIG. 1 is a diagram illustrating an arrangement enabling external transmission calibration according to the prior art.
Figure 2:
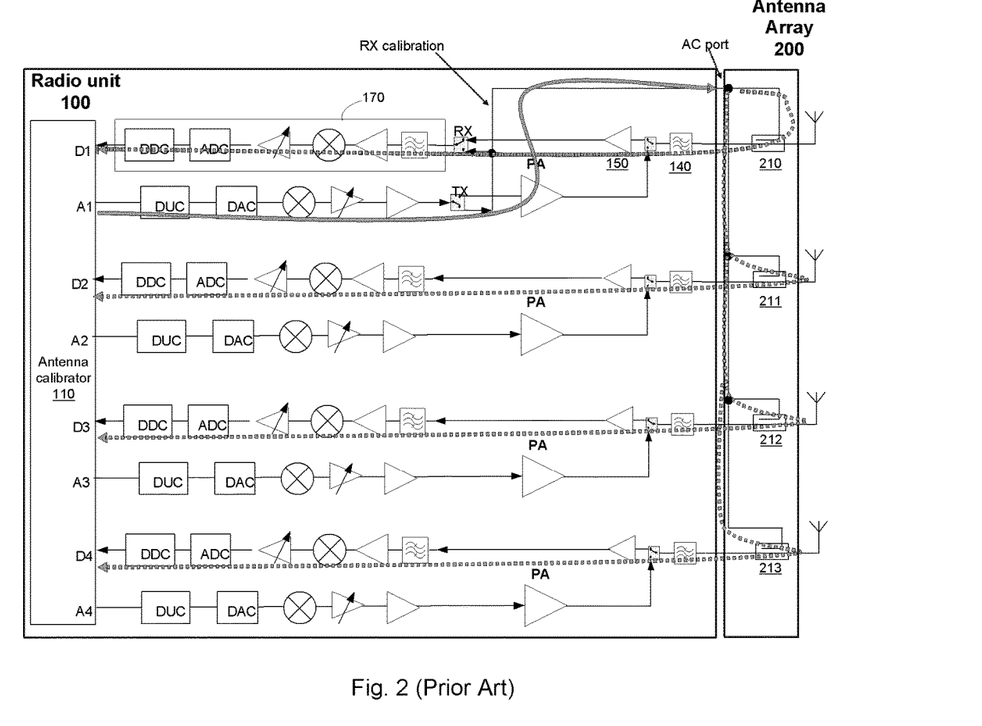
FIG. 2 is a diagram illustrating an arrangement enabling external reception calibration according to the prior art.

FIGS. 1 and 2 are schematic diagrams illustrating conventional approaches for transmission calibration and reception calibration, respectively. As shown in FIGS. 1 and 2, for both transmission calibration and reception calibration, the same hardware arrangement of a radio unit 100 connected with an antenna array 200 is used. Inside the antenna array, there is arranged a calibration network. The calibration network is consisted of multiple couplers 210-213, which enable signals received at the antenna array 200 from the radio unit 100 to be coupled back to the radio unit 100.

For transmission calibration, individually identifiable reference signals are initially generated by an antenna calibrator 110 within the radio unit 100. Then, the individually identifiable reference signals pass through individual transmission paths within the radio unit 100 and are coupled back to an antenna calibration (AC) port through the calibration network, respectively (as denoted by the dotted lines in FIG. 1). As shown in detail in FIG. 1, all the transmission paths have the same structure. Taking the second transmission path as an example, each of the transmission paths comprises a transmission signal processing section 121 followed by a power amplifier (PA) 131 and a bandpass filter 141. The transmission signal processing section 121 is consisted of a digital up-converter (DUC) 1211, a digital-analog converter (DAC) 1212, a frequency mixer 1213, an amplitude adjuster 1214 and an amplifier 1215.

Next, the individually identifiable reference signals pass through a reception signal processing section 170 and arrive at the antenna calibrator 110 (as denoted by the solid line in FIG. 1). As shown in detail in FIG. 1, the reception signal processing section 170 comprises a filter 1701, an amplifier 1702, a frequency mixer 1703, an amplitude adjuster 1704, an analog-digital converter (ADC) 1705 and a digital down-converter (DDC) 1706.

Finally, at the antenna calibrator 110, transmission calibration vectors used to compensate for the difference among transmission paths are computed by comparing the received signals with the reference signals.

For the reception calibration, a reference signal is initially generated by the antenna calibrator 110. Then, the reference signal passes through the first transmission signal processing section within the radio unit 100 and is directed to the AC port. Next, the reference signal is coupled back to the radio unit 100, passes through individual reception paths within the radio unit 100 and arrives at the antenna calibrator 110. As shown in detail in FIG. 2, all the reception paths have the same structure. Taking the first reception path as an example, each of the reception paths comprises a bandpass filter 140 followed by a low noise amplifier (LNA) 150 and the reception signal processing session 170.

Finally, at the antenna calibrator 110, transmission calibration vectors used to compensate for the difference among reception paths are computed by comparing the received signals with the reference signal.

As can be seen from the above, the conventional approaches for transmission calibration and reception calibration both rely on the calibration network outside the radio unit. Thus, from the perspective of the radio unit, the conventional transmission/reception calibration is called external antenna calibration.

Although antenna arrays with calibration network were widely adopted by veteran TDD operators, there are more and more newly-emerging TDD operators using antenna arrays without calibration network in their TDD communication networks.

Figure 3:
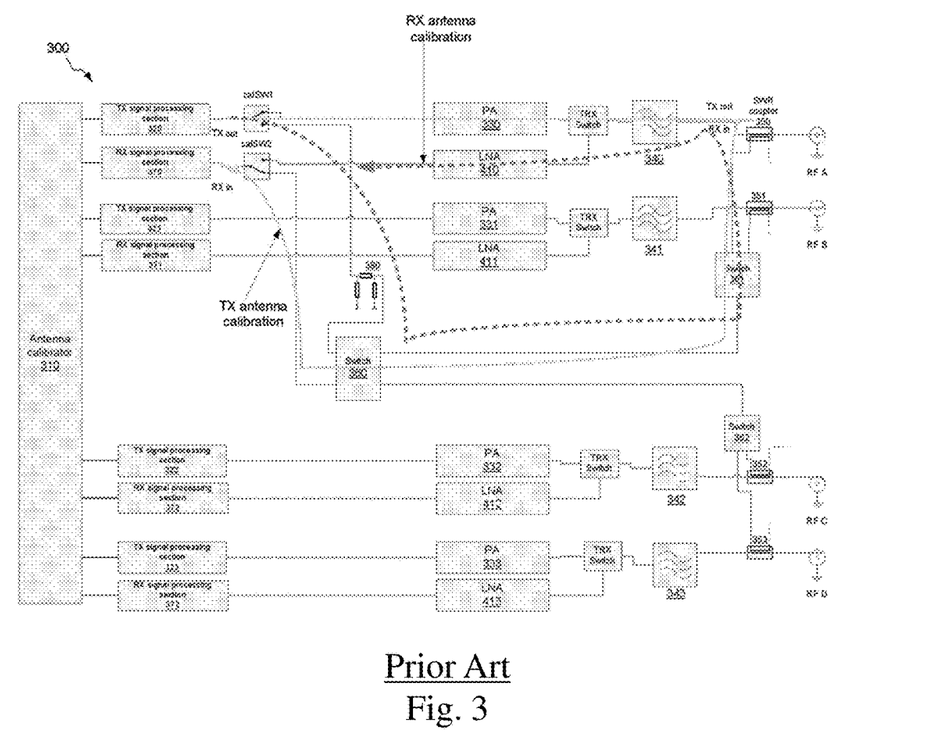
FIG. 3 is a diagram illustrating a radio unit with a build-in calibration network enabling internal transmission/reception calibration for different transmission/reception paths in succession.

In order for those new TDD operators to perform antenna calibration and thus to benefit from smart antenna beam forming, there has been proposed a radio unit with a build-in calibration network. As an example of the proposed radio unit, FIG. 3 illustrates a radio unit 300 comprising an antenna calibrator 310, transmission signal processing sections 320-323, power amplifiers 330-333, bandpass filters 340-343, couplers 350-353, reception signal processing sections 370-373, switches 360-362 and LNAs 410-413. The antenna calibrator 310, transmission signal processing sections 320-323, power amplifiers 330-332, bandpass filters 340-343, reception signal processing sections 370-373 and LNAs 410-413 of the radio unit 300 have their counterparts in the radio unit described above with respect to FIGS. 1 and 2, while the couplers 350-353 and the switches 360-362 are newly added elements which constitute the build-in calibration network of the radio unit 300.

With the architecture of the proposed radio unit 300, transmission/reception calibration can be performed even if the antenna array connected to the radio unit does not have a build-in calibration network. In this case, the antenna calibration relies on the calibration network inside the radio unit 300 and is therefore referred to as internal antenna calibration.

As shown in detail in FIG. 3, for calibrating the first transmission path within the radio unit 300, a reference signal generated by the antenna calibrator 310 passes through the transmission signal processing section 320 followed by the PA 330 and the bandpass filter 340, and is coupled back to the reception signal processing section 370 via the coupler 350, the switch 360 and the switch 361 (as denoted by the solid line in FIG. 3). Similarly, for calibrating each of the other transmission paths, a reference signal generated by the antenna calibrator 310 may pass through a corresponding one of the transmission signal processing sections 321-323 followed by the PAs 331-333 and the bandpass filters 341-343, and be coupled back to the reception signal processing section 370 via the coupler 350, the switch 360 and the switch 361 or 362. In this case, the switches 360-362 cooperate with each other to select only one transmission path at a time to be subject to internal transmission calibration. Accordingly, the internal transmission calibration must be performed with respect to different transmission paths in succession (i.e., at different times).

Likewise, for calibrating the first reception path within the radio unit 300, a reference signal generated by the antenna calibrator 310 is coupled back to the bandpass filter 340 via an attenuator 390, the switch 360, the switch 361 and the coupler 350, and passes through the bandpass filter 340 followed by the LNA 410 and the reception signal processing section 370 (as denoted by the dotted line in FIG. 3). Similarly, for calibrating each of the other reception paths, a reference signal generated by the antenna calibrator 310 may be coupled back to a corresponding one of the bandpass filters 341-343 via the attenuator, the switch 360, the switch 361 or 362 and a corresponding one of the couplers 351-353, and pass through the corresponding one of the bandpass filters 341-343 followed by the LNAs 411-413 and the reception signal processing sections 371-373. In this case, the switches 360-362 cooperate with each other to select only one reception path at a time to be subject to internal reception calibration. Accordingly, the internal reception calibration must be performed with respect to different reception paths at different times.

Being performed for individual transmission/reception paths at different times as set forth with respect to FIG. 3, the above-described internal transmission/reception calibration approach may suffer from inaccuracy due to the time-varying phase of the radio unit's local oscillator (LO).

Figure 4:
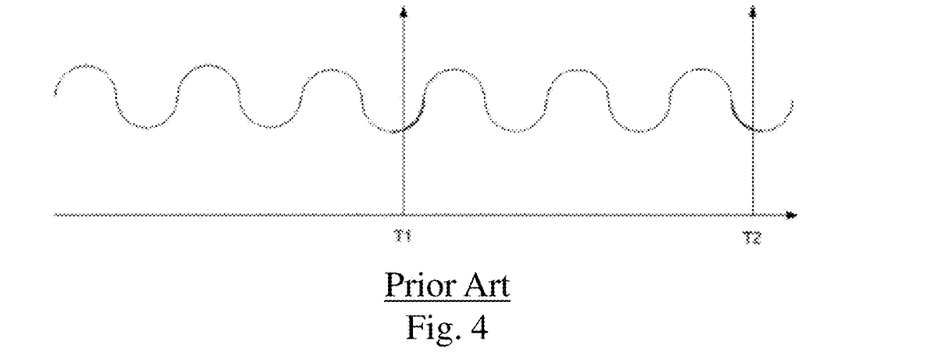
FIG. 4 is a diagram illustrating a time-varying phase of a radio unit's LO.

Specifically, supposing the phase of the radio unit's LO changes over time as illustrated in FIG. 4 and the transmission calibration is performed with respect to two different transmission paths at different times T1 and T2, calibration inaccuracy for the different transmission paths would be caused by the difference between the phase of the radio unit's LO at the time T1 and the phase of the radio unit's LO at the time T2. Likewise, calibration inaccuracy for different reception paths would be caused by the difference among the radio unit's LO phases at different times.

Although the calibration inaccuracy caused by the time-varying phase of the radio unit's LO can be reduced by performing long-term average antenna calibration, the time and the radio resources required for antenna calibration would increase significantly.

SUMMARY

In view of the foregoing, an object of the present disclosure is to overcome at least one of the drawbacks of the radio unit with the above-described internal transmission/reception calibration.

To achieve the object, according to a first aspect of the disclosure, there is provided a radio unit comprising an antenna calibrator, a plurality of transmission signal processing sections, a plurality of power amplifiers, a plurality of bandpass filters, a plurality of couplers, a plurality of reception signal processing sections and a first combiner. The antenna calibrator is configured to generate a plurality of individually identifiable reference signals used for transmission calibration. The transmission signal processing sections are configured to modulate the signals in parallel. The power amplifiers are configured to amplify the modulated signals to predetermined power levels in parallel. The bandpass filters are configured to apply bandpass filtering operations to the modulated signals in parallel. The couplers are configured to couple the filtered signals to a first combiner, which combines the filtered signals. One of the reception signal processing sections is configured to identify and demodulate each of the filtered signals constituting the combined signals. The antenna calibrator is further configured to compute transmission calibration vectors by comparing the demodulated signals with the reference signals.

The radio unit according to the first aspect of the disclosure allows internal transmission calibration for all transmission paths to be performed in parallel (i.e., at the same time), thereby thoroughly eliminating the transmission calibration inaccuracy caused by the difference among the radio unit's LO phases at different times.

According to a second aspect of the disclosure, the radio unit may further comprise a plurality of low noise amplifiers. The antenna calibrator may be further configured to generate a reference signal used for reception calibration. One of the plurality of transmission signal processing sections may be further configured to modulate the signal. The first combiner may be further configured to split the modulated signal. The plurality of couplers may be further configured to couple the split signals to the plurality of bandpass filters. The plurality of bandpass filters may be further configured to apply bandpass filtering operations to the split signals in parallel. The plurality of low noise amplifiers may be configured to amplify the filtered signals to predetermined power levels in parallel. The plurality of reception signal processing sections may be further configured to demodulate the amplified signals in parallel. The antenna calibrator may be further configured to compute reception calibration vectors by comparing the demodulated signals with the reference signal.

The radio unit according to the second aspect of the disclosure allows internal reception calibration for all reception paths to be performed in parallel (i.e., at the same time), thereby thoroughly eliminating the reception calibration inaccuracy caused by the difference among the radio unit's LO phases at different times.

According to a third aspect of the disclosure, the radio unit may further comprise three switches. A first one of the three switches may be configured to direct the modulated signal from the one of the plurality of transmission signal processing sections to its respective power amplifier in the case of internal transmission calibration, and to direct the modulated signal from the one of the plurality of transmission signal processing sections to the first combiner via a third one of the three switches in the case of internal reception calibration. A second one of the three switches may be configured to direct the filtered signal to the one of the plurality of reception signal processing sections from its respective LNA in the case of internal reception calibration, and to direct the combined signal to the one of the plurality of reception signal processing sections from the first combiner via the third one of the three switches in the case of internal transmission calibration.

According to a fourth aspect of the disclosure, the radio unit may further comprise a Voltage Standing Wave Ratio (VSWR) measurement unit, a first plurality of switches connected between the first combiner and the couplers, a second combiner and a second plurality of switches connected between the second combiner and the couplers. Forward powers for respective antenna branches are respectively sent back to the first plurality of switches, and reflected powers for respective antenna branches are respectively sent back to the second plurality of switches. In a case where VSWR measurement is performed for one antenna branch, only a corresponding one of the first switches and a corresponding one of the second switches are closed, so that a corresponding one of the forward powers is selected by the first combiner and a corresponding one of the reflected powers is selected by the second combiner. The VSWR measurement unit may be configured to compute the VSWR for the antenna branch based on the selected forward power and reflected power.

According to a fifth aspect of the disclosure, the radio unit may further comprise a fourth switch. The fourth switch may be configured to direct the combined signal from the first combiner to the one of the reception signal processing sections or direct the modulated signal from the one of the transmission signal processing sections to the first combiner in the case of internal antenna calibration, and to direct the selected forward power from the first combiner to the VSWR measurement unit in the case of VSWR measurement.

According to a sixth aspect of the disclosure, the radio unit may further comprise an external calibration port for external antenna calibration.

According to a seventh aspect of the disclosure, the radio unit may further comprise a fifth switch. The fifth switch may be configured to direct the combined signal from the first combiner to the one of the reception signal processing sections or direct the modulated signal from the one of the transmission signal processing sections to the first combiner in the case of internal antenna calibration, and to direct a combined signal from the external calibration port to the one of the reception signal processing sections or direct the modulated signal from the one of the transmission signal processing sections to the external calibration port in the case of external antenna calibration.

According to an eighth aspect of the disclosure, the radio unit may be a Remote Radio Unit (RRU).

According to a ninth aspect of the disclosure, the antenna calibrator (510) of the radio unit (500) may be implemented in a BaseBand Unit (BBU) and other components of the radio unit (500) than the antenna calibrator (510) may be implemented in an RRU. The RRU comprises a Common Public Radio Interface (CPRI), via which the RRU communicates with the BBU.

According to a tenth aspect of the disclosure, there are four or eight transmission and/or reception paths within the radio unit.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Initially, a radio unit 500 according to a first embodiment of the disclosure will be described with respect to FIG. 5. As illustrated, the radio unit 500 comprises an antenna calibrator 510, a plurality of transmission signal processing sections 520-523, a plurality of power amplifiers 530-533, a plurality of bandpass filters 540-543, a plurality of couplers 550-553, a plurality of reception signal processing sections 570-573 and a first combiner 560. The antenna calibrator 510 is configured to generate a plurality of individually identifiable reference signals used for transmission calibration. The transmission signal processing sections 520-523 are configured to modulate the signals in parallel. The power amplifiers 530-533 are configured to amplify the modulated signals to predetermined power levels in parallel. The bandpass filters 540-543 are configured to apply bandpass filtering operations to the modulated signals in parallel. The couplers 550-553 are configured to couple the filtered signals to a first combiner, which combines the filtered signals. One of the reception signal processing sections 570-573 is configured to identify and demodulate each of the filtered signals constituting the combined signals. The antenna calibrator 510 is further configured to compute transmission calibration vectors by comparing the demodulated signals with the reference signals. As known to those skilled in the art, in order to be individually identifiable at the antenna calibrator 510, the reference signals may be orthogonal in frequency, time or code domain.

Figure 5:
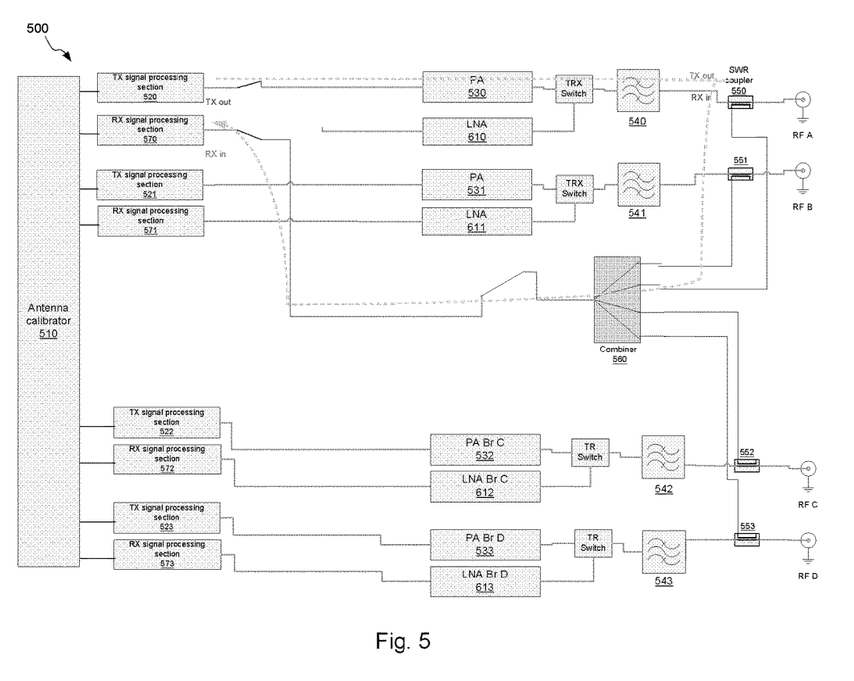
FIG. 5 is a diagram illustrating a radio unit enabling internal transmission calibration for all transmission paths in parallel according to a first embodiment of the disclosure.

Unlike the switches 360-362 of the radio unit 300 which cooperate with each other to direct only one of the filtered signals from the couplers 350-353s to the reception signal processing section 370 at a time, the filtered signals from the couplers 560-563 are combined by the combiner 560 of the radio unit 500 and passed to the reception signal processing section 370 at the same time (as denoted by the dotted line in FIG. 5). Such an arrangement allows internal transmission calibration for all transmission paths to be performed in parallel (i.e., at the same time), thereby thoroughly eliminating the transmission calibration inaccuracy caused by the difference among the radio unit's LO phases at different times.

As those skilled in the art will appreciate, although an exemplary radio unit with four transmission paths is described for illustrative purpose, the number of the transmission paths of the radio unit 500 is not limited. Instead, the radio unit 500 may be structured to have more or less transmission paths, which correspond to the antenna elements of the antenna array to be used with the radio unit 500. For example, if the antenna array to be used with the radio unit 500 contains eight antenna elements, the radio unit 500 shall be provided with eight transmission paths correspondingly.

Figure 6:
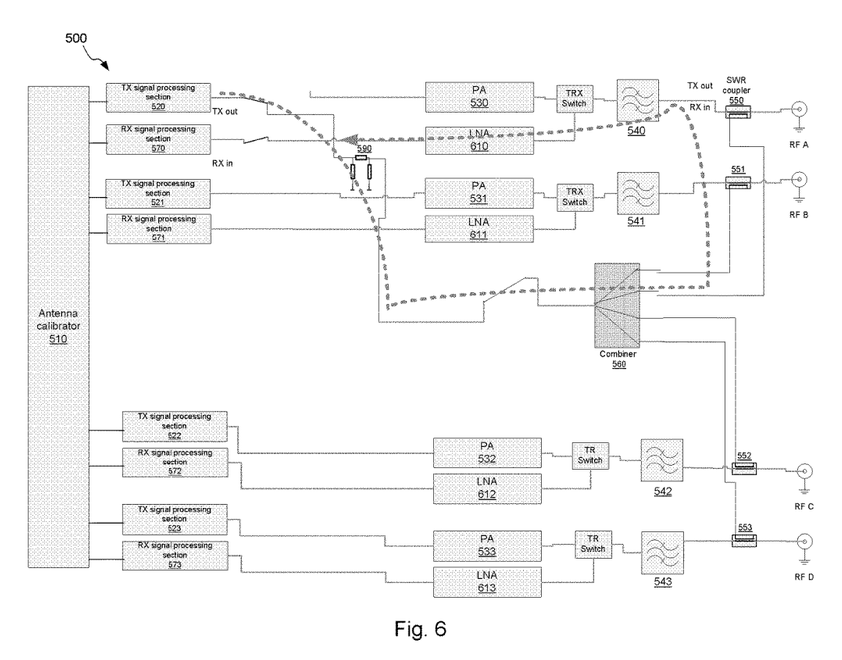
FIG. 6 is a diagram illustrating a radio unit enabling internal reception calibration for all reception paths in parallel according to a second embodiment of the disclosure.

According to a second embodiment of the disclosure as illustrated in FIG. 6, the antenna calibrator 510 may be further configured to generate a reference signal used for reception calibration. One of the plurality of transmission signal processing sections 520-523 may be further configured to modulate the signal. The first combiner 560 may be further configured to split the modulated signal. The plurality of couplers 550-553 may be further configured to couple the split signals to the plurality of bandpass filters 540-543. The plurality of bandpass filters 540-543 may be further configured to apply bandpass filtering operations to the split signals in parallel. A plurality of low noise amplifiers 610-613 may be configured to amplify the filtered signals to predetermined power levels in parallel. The plurality of reception signal processing sections 570-573 may be further configured to demodulate the amplified signals in parallel. The antenna calibrator 510 may be further configured to compute reception calibration vectors by comparing the demodulated signals with the reference signal. Preferably, an attenuator 590 is present between the transmission processing section 520 and the first combiner 580 to protect components of the radio unit 510.

In this manner, the modulated reference signal from the transmission signal processing section 520 is spilt by the combiner 560 of the radio unit 500 and passed to couplers 560-563 at the same time (as denoted by the dotted line in FIG. 6). Such an arrangement allows internal reception calibration for all reception paths to be performed in parallel (i.e., at the same time), thereby thoroughly eliminating the reception calibration inaccuracy caused by the difference among the radio unit's LO phases at different times.

Also, although an exemplary radio unit with four reception paths is described for illustrative purpose, the number of the reception paths of the radio unit is not limited.

Figure 7:
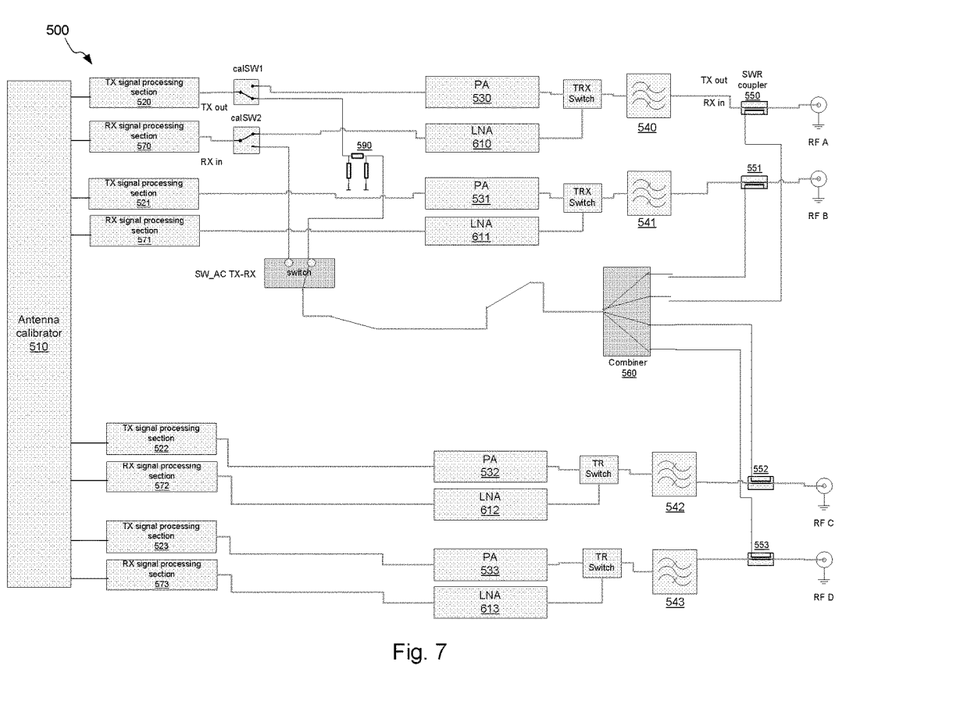
FIG. 7 is a diagram illustrating a radio unit enabling flexible switching between internal parallel transmission calibration and the internal parallel reception calibration according to a third embodiment of the disclosure.

According to a third embodiment of the disclosure as illustrated in FIG. 7, the radio unit 500 may be further provided with three switches calSW1, calSW2 and SW_AC_TX-RX. In the case of transmission calibration as illustrated in FIG. 5, the switch calSW1 may be configured to direct the modulated signal from the one of the plurality of transmission signal processing sections 520-523 to its respective power amplifier. The switch calSW2 may be configured to direct the combined signal to the one of the plurality of reception signal processing sections 570-573 from the combiner 560 via the switch SW_AC_TX-RX.

In the case of reception calibration as illustrated in FIG. 6, the switch calSW1 may be configured to direct the modulated signal from the one of the plurality of transmission signal processing sections 520-523 to the combiner 560 via the switch SW_AC_TX-RX. The switch calSW2 may be configured to direct the filtered signal to the one of the plurality of reception signal processing sections 570-573 from its respective low noise amplifier 610-613.

In this manner, it is possible to flexibly switch between the transmission calibration and the reception calibration by simply controlling the switches calSW1, calSW2 and SW_AC_TX-RX.

In practical implementation, it is desirable for the radio unit to provide Voltage Standing Wave Ratio (VSWR) measurement function in addition to the above-described internal parallel antenna calibration function. Although this can be achieved by incorporating a full set of components required for VSWR measurement into the radio unit, the cost for manufacturing the radio unit increases additively.

Figure 8:
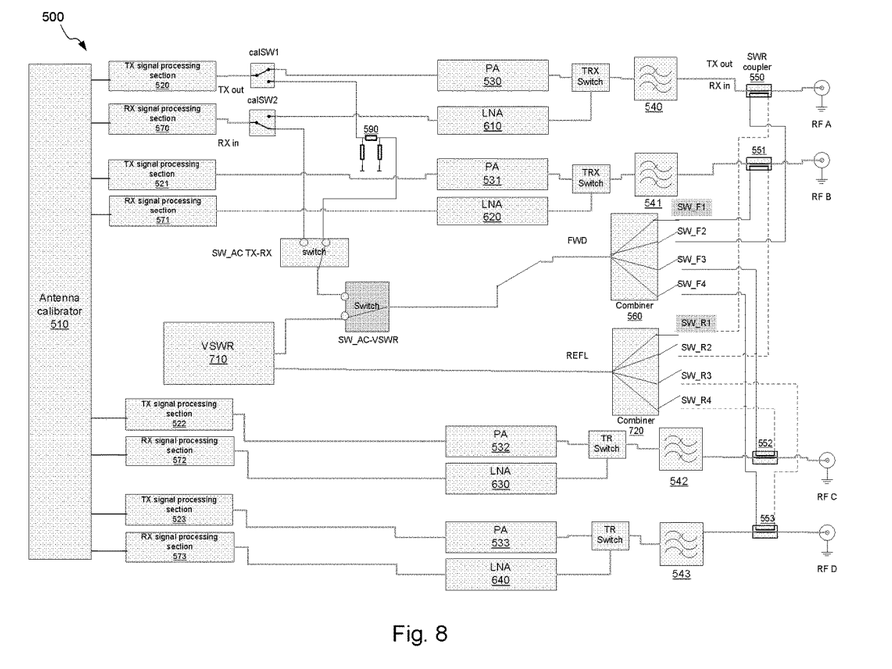
FIG. 8 is a diagram illustrating a radio unit enabling internal parallel antenna calibration and VSWR measurement according to a fourth embodiment of the disclosure.

In an embodiment, the radio unit 500 may be further provided with a Voltage Standing Wave Ratio (VSWR) measurement unit 710, a first plurality of switches SW_F1, SW_F2, SW_F3 and SW_F4 connected between the first combiner 560 and the couplers 550-553, a second combiner 720 and a second plurality of switches SW_R1, SW_R2, SW_R3 and SW_R4 connected between the second combiner 720 and the couplers 550-553, as illustrated in FIG. 8.

Forward powers for respective antenna branches are respectively sent back to the first plurality of switches SW_F1, SW_F2, SW_F3 and SW_F4, and reflected powers for respective antenna branches are respectively sent back to the second plurality of switches SW_R1, SW_R2, SW_R3 and SW_R4.

In a case where VSWR measurement is performed for the first antenna branch, only the switch SW_F1 and the corresponding switch SW_R1 are closed, so that a corresponding one of the forward powers is selected by the first combiner 560 and a corresponding one of the reflected powers is selected by the second combiner 720. The VSWR measurement unit 710 is configured to compute the VSWR for the first antenna branch based on the selected forward power and reflected power.

Similarly, VSWR measurement may be performed with respect to the second to the fourth antenna branches in succession by successively closing the switches SW_F2, SW_F3 and SW_F4 and the switches SW_R2, SW_R3 and SW_R4 in pairs.

In this manner, the components of the radio unit 500 used for antenna calibration may be reused for VSWR measurement to the maximum extent. Accordingly, the cost for manufacturing a radio unit supporting both the internal parallel antenna calibration function and the VSWR measurement function can be reduced significantly.

In an embodiment, the radio unit 500 may be further provided with a fourth switch SW_AC-VSWR. In the case of antenna calibration, the switch SW_AC-VSWR may be configured to direct the combined signal from the first combiner 560 to the one of the reception signal processing sections 570-573 or direct the modulated signal from the one of the transmission signal processing sections 520-523 to the first combiner 560. In the case of VSWR measurement, the switch SW_AC-VSWR may be configured to direct the selected forward power from the first combiner 560 to the VSWR measurement unit 710, as illustrated in FIG. 8.

In this manner, it is possible to flexibly switch between the antenna calibration and the VSWR measurement by simply controlling the switch SW_AC-VSWR.

Figure 9:
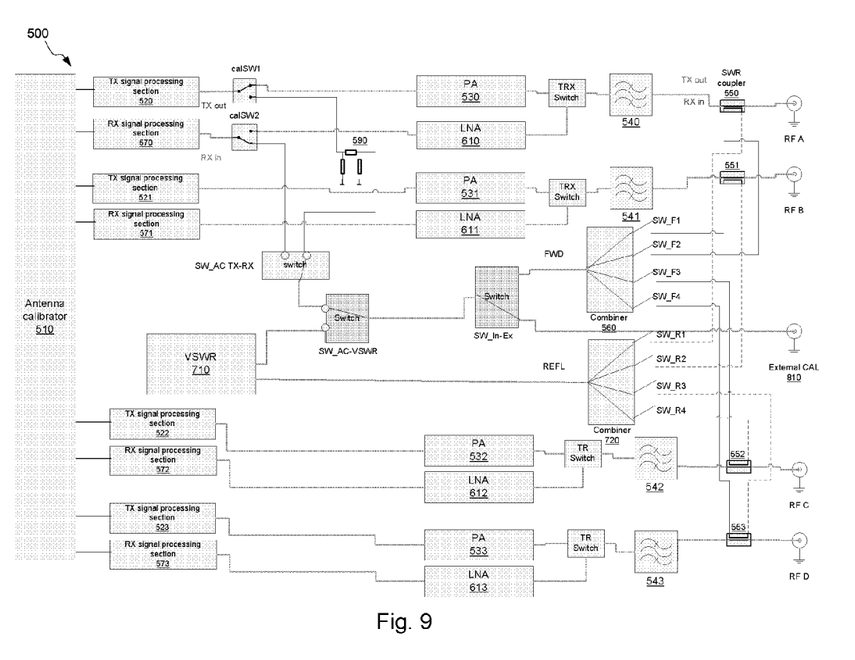
FIG. 9 is a diagram illustrating a radio unit enabling internal parallel antenna calibration, VSWR measurement and external antenna calibration according to a fifth embodiment of the disclosure.

To support the conventional external antenna calibration in addition to the proposed internal parallel antenna calibration, the radio unit 500 may further comprise an external calibration port 810 as illustrated in FIG. 9.

Additionally, the radio unit 500 may be provided with a fifth switch SW_IN-EX. In the case of internal antenna calibration, the switch SW_IN-EX may be configured to direct the combined signal from the first combiner 560 to the one of the reception signal processing sections 570-573 or direct the modulated signal from the one of the transmission signal processing sections 520-523 to the first combiner 560. In the case of external antenna calibration, the switch SW_IN-EX may be configured to direct a combined signal from the external calibration port 810 to the one of the reception signal processing sections 570-573 or direct the modulated signal from the one of the transmission signal processing sections 520-523 to the external calibration port 810.

In this manner, it is possible to flexibly switch between the internal antenna calibration and the external antenna calibration by simply controlling the switch SW_IN-EX.

In practical implementation, all components of the above-described radio unit 500 may be implemented in a Remote Radio Unit (RRU). In this case, the radio unit 500 is exactly the RRU.

Alternatively, the antenna calibrator 510 of the radio unit 500 may be implemented in a BaseBand Unit (BBU) while the other components of the radio unit (500) may be implemented in an RRU. The RRU comprises a Common Public Radio Interface (CPRI), via which the RRU communicates with the BBU. In this case, the radio unit 500 is made up of the BBU and the RRU.

The present disclosure has been described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A radio unit, comprising:
    an antenna calibrator configured to generate a plurality of individually identifiable reference signals used for transmission calibration;
    a plurality of transmission signal processing sections configured to modulate the individually identifiable reference signals in parallel;
    a plurality of power amplifiers configured to amplify the modulated signals to predetermined power levels in parallel;
    a plurality of bandpass filters configured to apply bandpass filtering operations to the amplified signals in parallel;
    a plurality of couplers configured to couple the filtered signals to a first combiner which combines the filtered signals; and
    a plurality of reception signal processing sections, one of which is configured to identify and demodulate each of the filtered signals constituting the combined signals;
    wherein the antenna calibrator is further configured to compute transmission calibration vectors by comparing the demodulated signals with the individually identifiable reference signals;
    wherein the radio unit further comprises a Voltage Standing Wave Ratio measurement unit, a first plurality of switches connected between the first combiner and the couplers, a second combiner and a second plurality of switches connected between the second combiner and the couplers;
    wherein forward powers for respective antenna branches are respectively sent back to the first plurality of switches, and reflected powers for respective antenna branches are respectively sent back to the second plurality of switches; and
    in a case where VSWR measurement is performed for one antenna branch, only a corresponding one of the first switches and a corresponding one of the second switches are closed, so that a corresponding one of the forward powers is selected by the first combiner and a corresponding one of the reflected powers is selected by the second combiner; and
    the VSWR measurement unit is configured to compute the VSWR for the antenna branch based on the selected forward power and reflected power.

2. The radio unit of claim 1, further comprising a plurality of low noise amplifiers, and wherein
    the antenna calibrator is further configured to generate a reference signal used for reception calibration;
    one of the plurality of transmission signal processing sections is further configured to modulate the reference signal;
    the first combiner is further configured to split the modulated signal;
    the plurality of couplers are further configured to couple the split signals to the plurality of bandpass filters;
    the plurality of bandpass filters are further configured to apply bandpass filtering operations to the split signals in parallel;
    the plurality of low noise amplifiers are configured to amplify the filtered signals to predetermined power levels in parallel;
    the plurality of reception signal processing sections are further configured to demodulate the amplified signals in parallel; and
    the calibrator is further configured to compute reception calibration vectors by comparing the demodulated signals with the reference signal.

3. The radio unit of claim 2, further comprising three switches, wherein
    a first one of the three switches is configured to direct the modulated signal from the one of the plurality of transmission signal processing sections to its respective power amplifier in the case of internal transmission calibration, and to direct the modulated signal from the one of the plurality of transmission signal processing sections to the first combiner via a third one of the three switches in the case of internal reception calibration; and
    a second one of the three switches is configured to direct the filtered signal to the one of the plurality of reception signal processing sections from its respective low noise amplifier in the case of internal reception calibration, and to direct the combined signal to the one of the plurality of reception signal processing sections from the first combiner via the third one of the three switches in the case of internal transmission calibration.

4. The radio unit of claim 1, further comprising
    a fourth switch configured to direct the combined signal from the first combiner to the one of the reception signal processing sections or direct the modulated signal from the one of the transmission signal processing sections to the first combiner in the case of internal antenna calibration, and to direct the selected forward power from the first combiner to the VSWR measurement unit in the case of VSWR measurement.

5. The radio unit of claim 1, further comprising an external calibration port for external antenna calibration.

6. The radio unit of claim 5, further comprising
a fifth switch configured to direct the combined signal from the first combiner to the one of the reception signal processing sections or direct the modulated signal from the one of the transmission signal processing sections to the first combiner in the case of internal antenna calibration, and to direct a combined signal from the external calibration port to the one of the reception signal processing sections or direct the modulated signal from the one of the transmission signal processing sections to the external calibration port in the case of external antenna calibration.

7. The radio unit of claim 1, wherein the radio unit is a Remote Radio Unit.

8. The radio unit of claim 1, wherein
the antenna calibrator of the radio unit is implemented in a BaseB and Unit and other components of the radio unit than the antenna calibrator are implemented in an RRU, and
the RRU comprises a Common Public Radio Interface, via which the RRU communicates with the BBU.

9. The radio unit of claim 1, wherein there are four or eight transmission and/or reception paths within the radio unit.

\* \* \* \* \*